United States Patent [19]
Bailly et al.

[11] Patent Number: 5,586,470
[45] Date of Patent: Dec. 24, 1996

[54] GEAR-CHANGING DEVICE FOR A GEAR BOX, IN PARTICULAR A MOTOR VEHICLE GEAR BOX

[75] Inventors: Gerhard Bailly; Detlef Baasch; Unal Gazyakan, all of Friedrichshafen, Germany

[73] Assignee: ZF Friedrichshafen AB, Friedrichshafen, Germany

[21] Appl. No.: 411,702

[22] PCT Filed: Oct. 22, 1993

[86] PCT No.: PCT/EP93/02920

§ 371 Date: Mar. 31, 1995

§ 102(e) Date: Mar. 31, 1995

[87] PCT Pub. No.: WO94/10484

PCT Pub. Date: May 11, 1994

[30] Foreign Application Priority Data

Oct. 28, 1992 [DE] Germany .................. 42 36 336.5

[51] Int. Cl.$^6$ .................................................. F16H 63/36
[52] U.S. Cl. ........................................................... 74/477
[58] Field of Search ................................. 74/477, 483 R

[56] References Cited

U.S. PATENT DOCUMENTS 5,481,935 1/1996 Bailly et al. .................. 74/477

FOREIGN PATENT DOCUMENTS

| 2750275 | 5/1979 | Germany . |
| 4137145 | 5/1993 | Germany . |
| 461850 | 2/1937 | United Kingdom . |
| 93/10377 | 5/1993 | WIPO . |

*Primary Examiner*—Allan D. Herrmann
*Attorney, Agent, or Firm*—Davis and Bujold

[57] ABSTRACT

The invention concerns a gear-changing device for a transmission, in particular a toothed gear system. During switching operations two gear stages of a gear group should not be simultaneously engaged. According to the invention this is prevented by the fact that a slider-crank mechanism (4) (oscillating cranks and a slide rod (1)) are moved from a stationary rest position to their switching position. The rest position is urged by coupling mechanisms (6). A driving position is established with the slide rod (1). In order to prevent two speeds from being simultaneously switched during a faulty operation, the distances between the rest positions and between the driving position (FIG. 1) of the coupling mechanisms (6) differ.

6 Claims, 2 Drawing Sheets

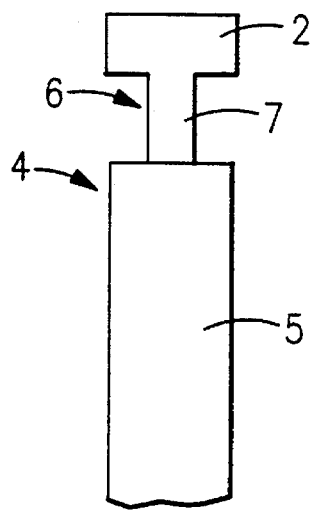
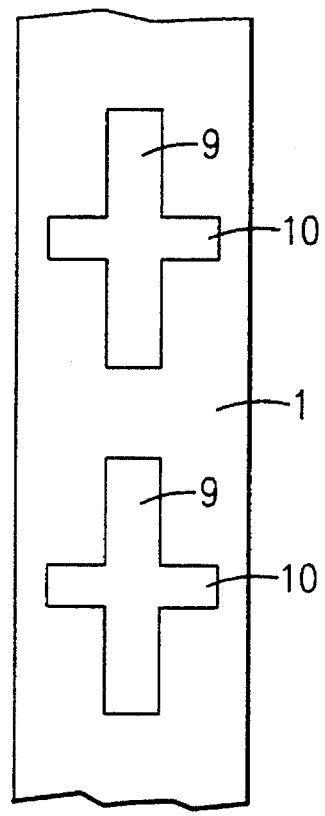
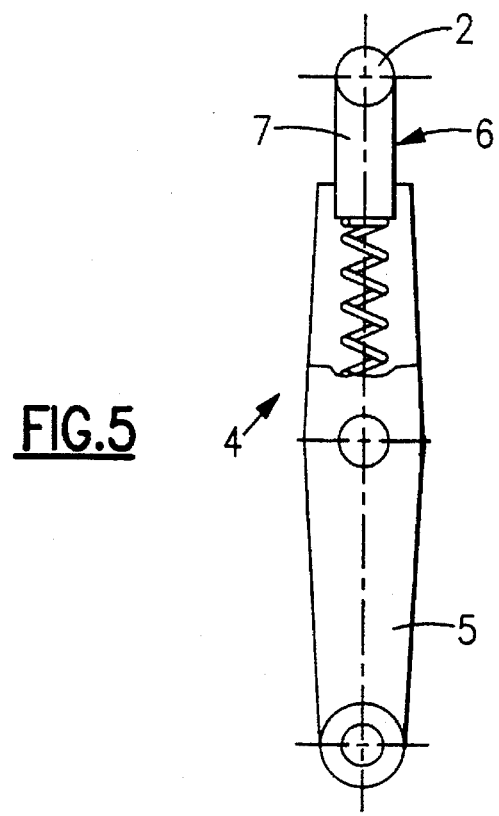

GEAR-CHANGING DEVICE FOR A GEAR BOX, IN PARTICULAR A MOTOR VEHICLE GEAR BOX

The invention concerns a gear-changing device for a transmission, in particular a motor vehicle transmission. In gear-changing operations of multi-step or multi-group toothed gear systems, such as in countershaft transmissions, two gear stages of a gear group should not be simultaneously engaged. A faulty operation results in a positive blocking of the gear group and therewith a blocking of the whole transmission line of the motor vehicle or also failure of the transmission. The related effects of the vehicle and surroundings thereof on gear change operations were difficult to control and could be serious.

BACKGROUND OF THE INVENTION

A gear-changing device where the gear-changing elements (for ex., dog rings) of the toothed gear system are moved to their switching position via a slider-crank mechanism is shown and described in the applicant's prior patent application (German patent application P 41 37 145.3 filed on Nov. 12, 1991 or European patent application). The slider-crank mechanisms are here formed by oscillating cranks and a slide rod. The oscillating cranks are connected with the slide rod, via coupling mechanisms, according to the speed to be engaged or there is produced a stationary stop, of the oscillating crank, on a part that is formed in the housing.

SUMMARY OF THE INVENTION

The problem on which this invention is based is to improve the gear-changing device of the former idea, in order to prevent, with certainty, the disadvantageous consequences of a possible faulty operation.

According to the invention said problem is solved by a gear-changing device for a transmission, in particular a motor vehicle transmission, having gear-changing elements moved from a stationary rest position to their switching position by slider-crank mechanisms, such as oscillating cranks and a slide rod, in a manner such that their coupling mechanisms are biased into their stationary rest positions and a driving position is produced with the slide rod, the distance between the rest positions and the distance between the driving positions of the coupling mechanisms being different.

By virtue of the distance between the rest positions and the distance between the driving positions, of the coupling mechanisms being unequal, there is established a safety, which acts geometrically-mechanically and prevents, with certainty, a blockage of a gear group in the case of a possible faulty operation. No simultaneous engagement of several speeds is possible.

In possible embodiments of the gear-changing device, the slide rod has driving apertures, the distance between which is smaller or greater than the distance between their coupling mechanisms in their rest positions. Depending on whether the distance is smaller or greater, a negative or positive offset results. In the case of a negative offset, the regulating distance of the slide rod lengthens, since an overlapping of the switching strokes occurs. If, on the contrary, a positive offset is selected, the switching intervals between adjacent switching sets is shortened. In accordance with the type of transmission, the expert will, in a given case, find the suitable offset.

In a preferred embodiment, at least one of the driving apertures is offset in relation to the rest position of the coupling mechanism associated therewith. Said drive aperture can be offset in such a manner that, in a selecting or switching operation, the coupling mechanisms leave the driving apertures in the slide rod or mesh therein at separate times. Thus, since the switching stroke becomes reduced by the offset of at least one driving aperture, there additionally results the possibility of shortening the switching times between adjacent gear-changing sets. Alternatively, the adjusted speed of the slide rod becomes reduced in the movement from one to the adjacent gear-changing set. Thus the selection operation becomes safer, without it being necessary to prolong the switching time when changing a gear-changing set.

BRIEF DESCRIPTION OF THE DRAWING(S)

Herebelow, an embodiment of the invention is explained in detail with reference to the drawings. In the drawings:

FIG. 3 is a partial diagrammatic side elevational view of the coupling mechanism of FIG. 1;

FIG. 4 is a partial diagrammatic top plan view of the slide rod of FIG. 1; and

FIG. 5 is a partial diagrammatic cut out front elevational view of the coupling mechanism of FIG. 1.

DESCRIPTION OF THE PREFERRED EMBODIMENT

Figure 1:
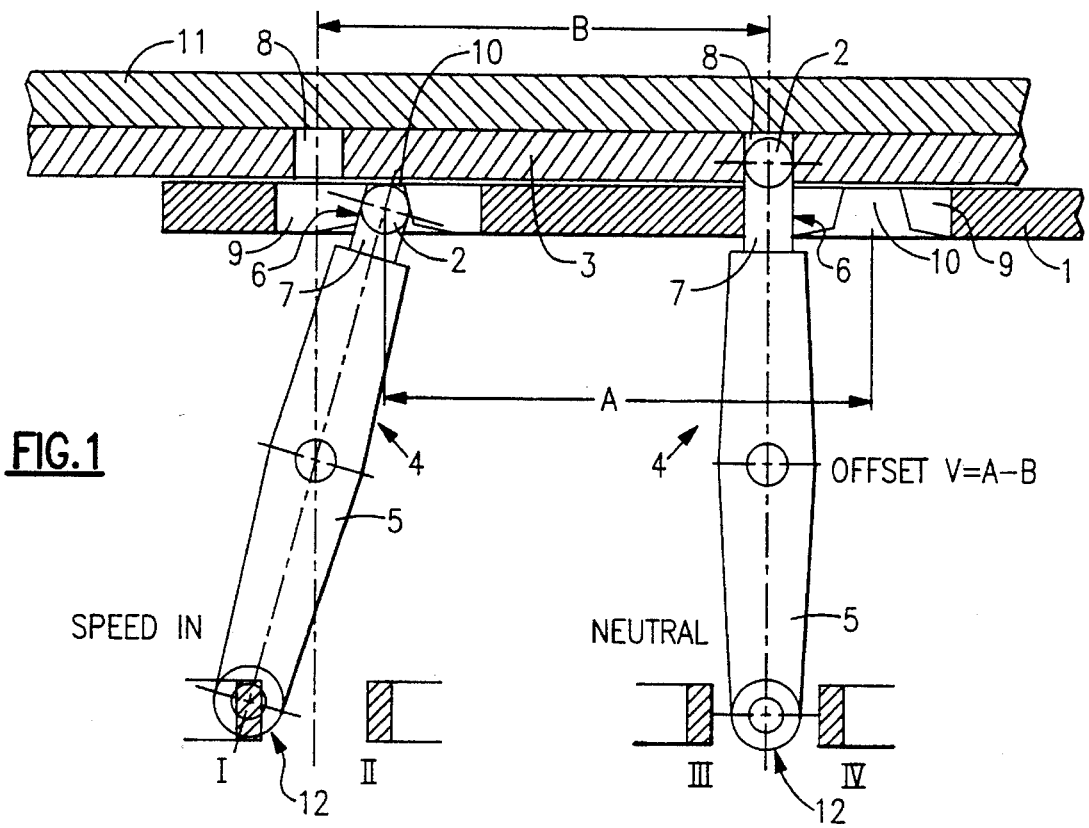
FIG. 1 is a diagrammatic cross section through a gear-changing device having two oscillating cranks of which one is in the coupled state.

To begin with, let the figures and description of the applicant's prior patent application cited above be incorporated herein by reference. The explanations given therein serve, insofar as convenient, for additionally explaining or supplementing the construction and operation of the gear-changing device according to the invention.

The gear-changing device has a slide rod 1 made, for ex., of flat steel material (the drawing shows a longitudinal section through the slide rod 1). The slide rod 1 can be longitudinally moved to different switching positions by movements to the left or to the right. For this purpose, the slide rod 1 is movably secured to a part 3, which is fixed to the housing such as the housing wall 11 of the transmission.

In the explained embodiment, four speeds,—divided in two gear-changing sets—which are marked by the Roman numerals I, II and III, IV, are switched. For this purpose, adequate switching elements 12, only diagrammatically shown, are provided which are moved from a stationary rest position to their respective switching position by a slider-crank mechanism 4. In the instant case, the slider-crank mechanism 4 is composed of oscillating cranks 5 and the slide rod 1.

Each one of the oscillating cranks 5 is provided with a coupling mechanism 6 at its upper end facing the slide rod 1. Each coupling mechanism 6 consists of a spring-loaded bolt 7, which is axially movably mounted on the oscillating crank 5 and its free end positively meshes either in the part 3 fixed to the housing or in the slide rod 1.

Suitable actuation devices, such as electromagnets, ensure that the bolts 7 engage either in the apertures 8 fixed to the housing or in driving apertures 9 of the slide rod 1.

The free ends of the bolts 7, preferably made T-shaped, are provided in the longitudinal direction of the slide rod 1. With their crossbars 2 they engage either the apertures 8, fixed to the housing, or the oblique slots 10 of the driving apertures 9 of the slide rod 1. The driving apertures 9 of the slide rod 1 are accordingly designed cross-shaped—as seen from a top view.

In the drawing of FIG. 1, the left oscillating crank 5 is in its coupled position with the slide rod 1. The bolt 7 of the coupling mechanism 6, lying to the left in the drawing, is driven via its crossbar 2 in the corresponding oblique slot 10 of the driving aperture 9 in the slide rod 1. The oscillating crank 5 has moved the switching element 12 to its switching position corresponding to speed I. The oscillating crank 5, lying to the right, is stationarily locked by its coupling mechanism 6. For this purpose the spring loaded bolt 7 meshes, via its crossbar 2, in the aperture 8 formed in the housing. The bolt 7 further penetrates the portion of the cross-shaped driving aperture 9 extending in the longitudinal direction in the slide rod 1. Hereby the axial movement of the slide rod 1 is not hindered when the oscillating crank 5 lying to the left is brought into or out of its switching position.

From the positions of the oscillating cranks 5 in FIG. 1, it can be understood in summary, that the left oscillating crank 5 switches the speed I while the right oscillating crank 5 assumes a neutral position between the speed positions III and IV. From that drawing it can further be understood that the oblique slot 10 of the (right) driving aperture 9 is laterally offset with respect to the aperture 8 formed in the housing.

The distance between the adjacent apertures 8, formed in the housing, is indicated with the letter "B" in the drawing. The oblique slots 10, of the driving apertures 9, assume a reciprocal distance "A" from each other. It is essential that the distance "B" and "A" be different. Thus, an offset "V" is obtained from the difference between the distances, "A" minus "B".

Figure 2:
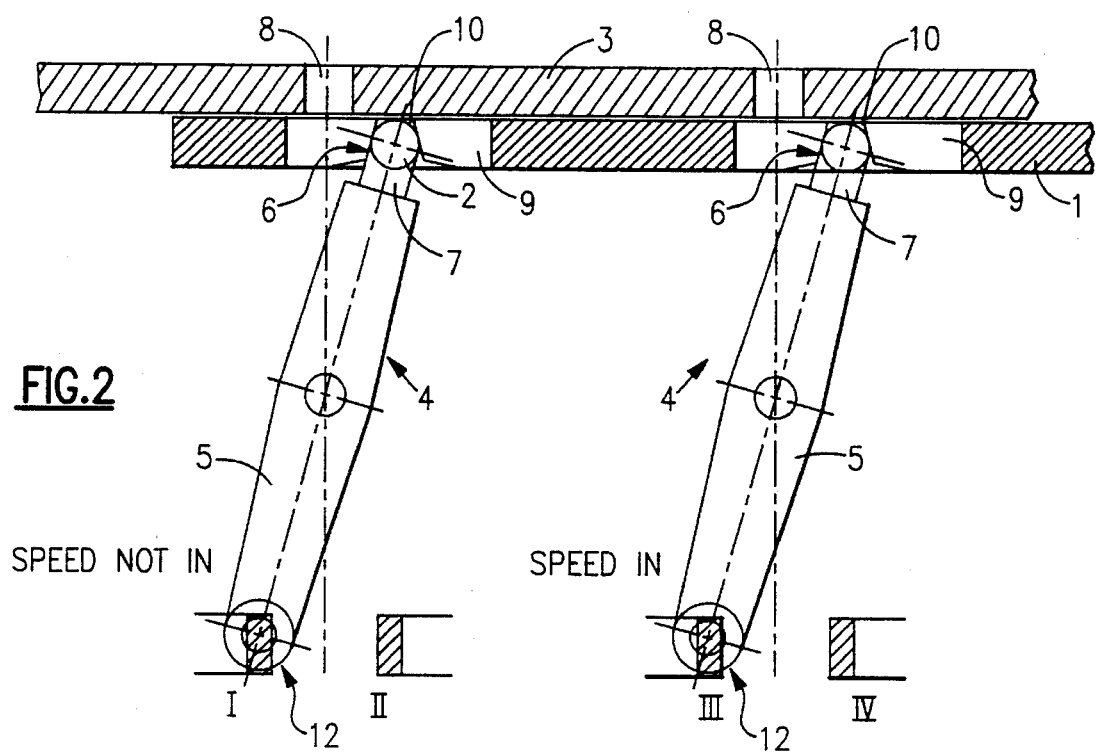
FIG. 2 is a diagrammatic cross section according to FIG. 1 in the case of a faulty operation.

In FIG. 2 the oscillating cranks 5 are plotted in a position in which their switching elements have been tilted in the same direction. Therefore, this case is that of a faulty operation. Both oscillating cranks 5 are connected with the slide rod 1 by a coupling mechanism 6. Since the distance marked "B", between the adjacent apertures 8 formed in the housing, does not coincide with the distance between the coupling mechanisms 6 of the oscillating cranks 5, there results a tilting of both oscillating cranks 5 of unequal magnitude. There exists a geometrical mechanical safety, that ensures that only one speed of a gear-switching set can be engaged and while it is engaged the other existing speed of the second gear-switching set remains unengaged. In the instant case, the speed III is engaged while the speed I remains unengaged.

In the reverse case the same logically applies so that, when the speed II, for ex., is engaged, the speed IV remains unengaged. The protection in the case of a faulty operation, which has a mechanical geometrical effect is to be attributed to the offset "V" or the unequal distances of "B" and "A".

In a selecting or switching operation of adjacent speeds, the offset "V" also causes the coupling mechanisms 6 to leave or mesh in the driving apertures 9 of the slide rod 1 at separated times. In the case of a negative offset (A=smaller), the regulating distance of the slide rod 1 during switching operations between adjacent gear-changing sets is lengthened, while it is reduced in the case of a positive offset (A=greater). This results in the additional possibility of abbreviating the switching times between adjacent gear-changing sets (due to the smaller regulating distance). It is alternatively possible to reduce the regulating speed of the slide rod 1 when moving from one to another gear-changing set. The selection operation thus takes place very safely, without having to prolong the switching time.

| Reference numerals | | | |
|---|---|---|---|
| 1 | slide rod | 6 | coupling mechanism |
| 2 | crossbar | 7 | bolt |
| 3 | part fixed to the housing | 8 | aperture fixed to the housing |
| 4 | slider-crank mechanism | 9 | driving aperture |
| 5 | oscillating cranks | 10 | oblique slot |

We claim:

1. A gear-changing device for a transmission comprising:
   a slider-crank mechanism (4) comprising a plurality of oscillating cranks (5) each being operably connected to a slide rod (1);
   one end of each of said plurality of oscillating cranks (5) supporting a coupling mechanism (6) while an opposite end of each of said plurality of oscillating cranks (5) communicating with a switching element (12);
   said slide rod (1) having a plurality of driving apertures (10) formed therein for accommodating said coupling mechanisms (6) when in a driving position;
   a housing having a plurality of rest apertures (8) formed therein for accommodating said coupling mechanisms (6) when in a rest position; and
   each of said plurality of switching elements (12) being movable, via the slider-crank mechanism (4), from a stationary position to a switching position in such a manner that the stationary position is urged by said coupling mechanism (6) and a driving position is achieved via the slide rod (1);
   wherein a spacing distance (B) between the rest apertures (8) formed in the housing (11) is different from a spacing distance (A) between driving apertures (10) formed in the slide rod (1).

2. A gear-changing device according to claim 1, wherein at least one of said driving apertures (10) is offset in relation to a rest position of said coupling mechanism (6) associated therewith.

3. A gear-changing device according to claim 1, wherein in the event of simultaneous driving of two of said plurality of oscillating cranks (5), the switching elements (12) are moved with a reverse offset.

4. A gear-changing device according to claim 3, wherein in the event of simultaneous driving of two of said plurality of oscillating cranks (5), a first speed is engaged by said slide rod (1) while another speed to be engaged in the same direction remains unengaged.

5. A gear-changing device according to claim 2, wherein the offset (V) of the driving apertures (10) is such that, during a switching operation, said coupling mechanisms (6) one of leave and mesh with said driving aperture (10) at separate times.

6. A gear-changing device according to claim 1, wherein an adjusting speed of said slide rod (1) is variable.

* * * * *